United States Patent [19]

Kreager

[11] Patent Number: 4,517,790
[45] Date of Patent: May 21, 1985

[54] APPARATUS AND METHOD FOR ULTRASONIC SEALING OF PACKAGES

[75] Inventor: William D. Kreager, Dallas, Tex.

[73] Assignee: Frito-Lay, Inc., Dallas, Tex.

[21] Appl. No.: 583,970

[22] Filed: Feb. 27, 1984

[51] Int. Cl.³ .................... B29C 27/08; B31B 21/14; B31B 21/60
[52] U.S. Cl. ........................................ 53/552; 53/451; 53/479; 53/373; 53/DIG. 2; 156/73.3; 156/353; 156/361; 156/515; 156/580.1; 156/580.2; 493/194; 493/203; 493/205; 493/208; 493/289
[58] Field of Search ...................... 156/73.1, 73.3, 203, 156/250, 251, 466, 510, 515, 580.1, 580.2, 353, 361; 53/451, 479, 567, 551, 552, 373, DIG. 2; 493/194, 203, 205, 208, 288, 289

[56] References Cited

U.S. PATENT DOCUMENTS

| 3,224,915 | 12/1965 | Balamuth et al. | 493/203 |
| 3,711,353 | 1/1973 | Zimmer | 156/277 |
| 3,823,055 | 7/1974 | Schulz et al. | 156/580.1 |
| 3,980,516 | 9/1976 | Guard | 156/515 |
| 4,025,374 | 5/1977 | Spindler et al. | 156/73.1 |
| 4,268,346 | 5/1981 | Achelpohl | 156/515 |
| 4,288,965 | 9/1981 | James | 53/451 |
| 4,373,982 | 2/1983 | Kreager et al. | 156/580.1 |

Primary Examiner—Michael Wityshyn
Attorney, Agent, or Firm—Bernard, Rothwell & Brown

[57] ABSTRACT

An apparatus and method for continuous rotary ultrasonic sealing of form and fill machines to produce packages utilizes a rotary anvil and cutter knife and an ultrasonic horn having adjustable simulated rotary motion movable in synchronism with the anvil for providing an end seal on packages.

15 Claims, 6 Drawing Figures

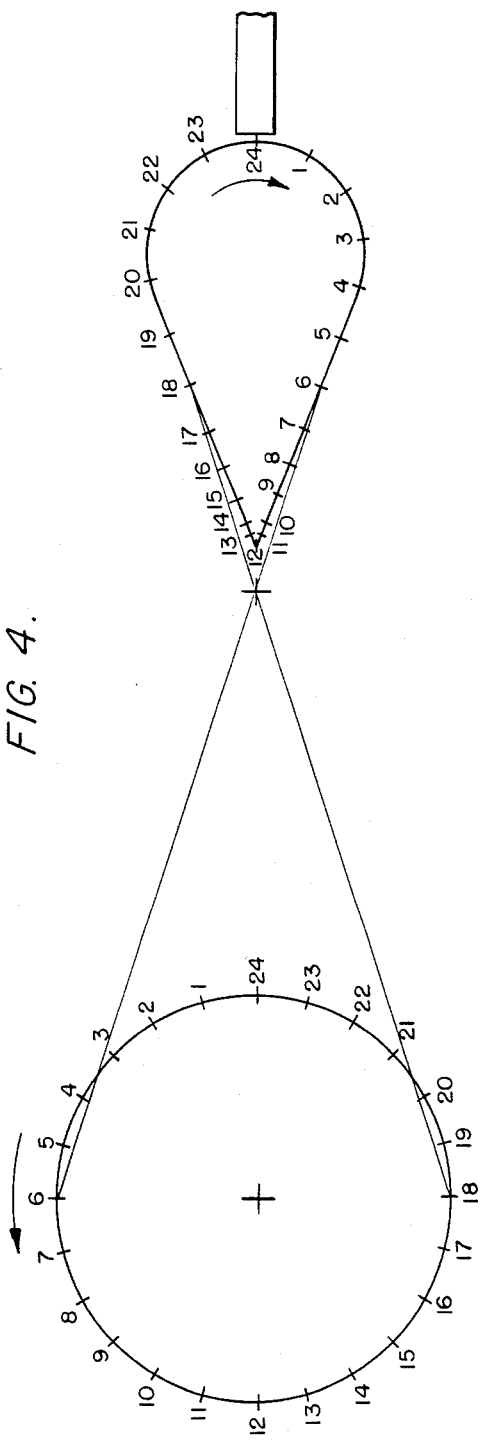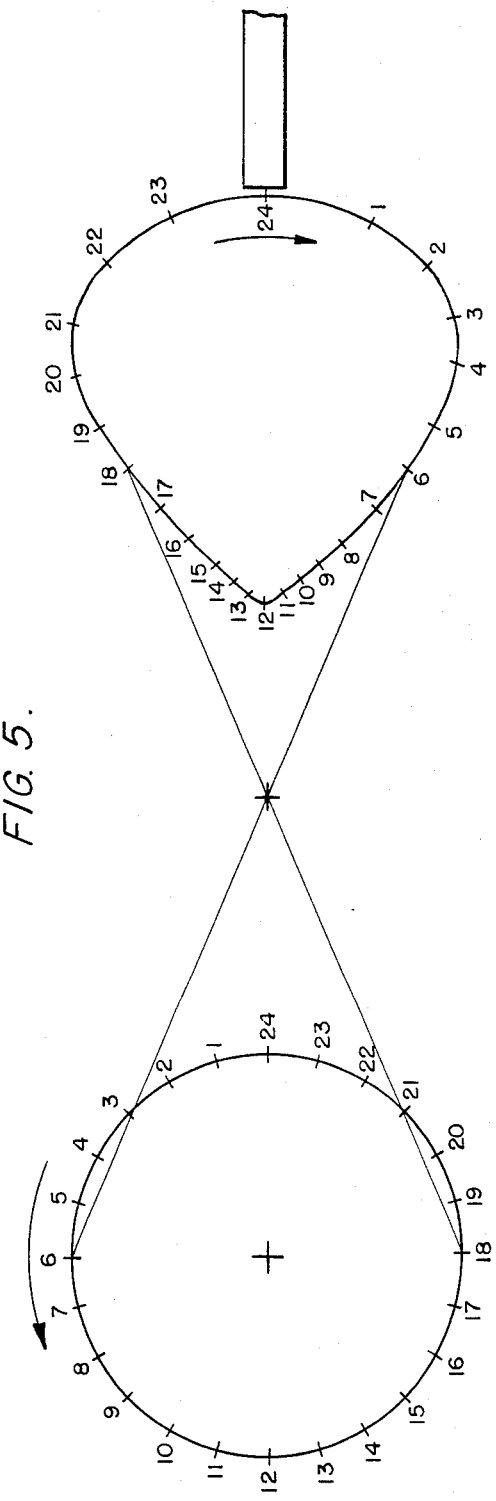
FIG. 4.
FIG. 5.

APPARATUS AND METHOD FOR ULTRASONIC SEALING OF PACKAGES

BACKGROUND OF THE INVENTION

1. Field of the Invention

This invention relates to improvement in the art of sealing of packages, and particularly to an improved apparatus for continuous ultrasonic sealing of packages made on a form and fill packaging machine.

2. Prior Art

Form and fill packaging machines are well known and commonly used in the prior art. In such machines a web of packaging material is directed to a forming shoe where it is formed into a tubular configuration and sealed longitudinally along its edges (back seal). The tube is also sealed transverse to its length and product is fed into the tube while it is being formed into packages. That is, the formed tube of packaging film has an end seal made transversely thereacross, the tube moves while the longitudinal or back seal is made and product inserted, then another end seal is made and the filled package is severed. This operation continues intermittently as movement of the packaging material is halted for making the end seal.

Typically, intermittent motion form and fill packaging machines use thermal transfer or thermal impulse seal equipment to provide the end seal. A typical example of known prior art form and fill machines is shown in expired U.S. Pat. No. 2,899,875 to W. C. Leasure.

The intermittent motion of intermittent form and fill machines is, obviously, a limitation of the machine's productive capabilities. If a form and fill machine could make a suitable end seal with the web moving continuously the dwell cycle could be removed and the capacity significantly increased.

The intermittent motion form and fill machines have historically had problems in seal continuity of the back seals produced thereon. It has also been difficult to provide a uniform quality multi-layer end seal with the conventional known prior art heat sealing. The use of heat transference through various package mediums as currently practiced with thermal seal systems is problem creating due to the fact that packaging material is commonly insulating and this thermal system is also energy intensive, i.e., a high user of electrical power.

It has also been known to use ultrasonics in connection with form and fill machines, that is the use of ultrasonic sealing of packages prepared on a form and fill machine. One such example is my prior patent, U.S. Pat. No. 4,373,982. This patent, however, is directed to providing a longitudinal or back seal for overlapping or fin-type edges and is directed specifically to an intermittent form and fill machine, although the concept disclosed in such patent is also capable of use in connection with a continuously moving form and fill machine.

There is a need in the art for ultrasonic sealing, not only of the longitudinal or back seals, but also the end seals so that a sealing machine can be completely ultrasonic. There is need in the art of form and fill machines for improvement of capacity by eliminating intermittent motion while providing high quality sealing without relying on adhesives and to be able to accomplish uniform high quality multi-layer gusseted end seals. There is also need in the art to eliminate the problems in connection with heat transference to various packaging films as experienced with current thermal seal systems in the form and fill machine art.

SUMMARY OF THE INVENTION

This invention provides an ultrasonic sealing apparatus for making package end seals in conjunction with a form and fill packager. The apparatus uses rotary motion so that the typical intermittent motion or rotary seal systems which currently use thermal transfer or impulse seal equipment may be dispensed with. The ultrasonic end seal system utilizes a rotary back-up anvil and a simulated rotary motion ultrasonic sealing horn in synchronism with one another, the sealing "stack" including a sealing horn being mounted on an eccentric with a movable pivot to control the residence time of the horn in the area of the seal. The device includes supportive film drive and handling equipment which includes a vacuum-type feed registry with respect to the film to control the ultrasonic sealing. A vibratory device or vibrator for settling excess product in the bag is mounted on or ahead of the vacuum belt box following the ultrasonic seal stack and anvil seal position. The vibrator is activated and run continuously during the product fill cycle to move product in the area to be sealed down into the bag before package seal takes place. Package severance from the web is achieved at the same time as the seal by a blade extended from the ultrasonic anvil to a depth nearly equal to the compressed gauge of material being sealed. A vacuum belt system following the seal maintains position of the severed bag to eliminate stress on a newly sealed package.

BRIEF DESCRIPTION OF THE DRAWINGS

FIG. 4 is a diagrammatic view illustrating one movement of the ultrasonic horn at one position of a movable pivot for the eccentric carrying the horn.

FIG. 5 is a diagrammatic view illustrating the path of travel of the ultrasonic horn at another position of a pivot for a crank arm carrying the horn.

DETAILED DESCRIPTION OF THE PREFERRED EMBODIMENT

Figure 1:
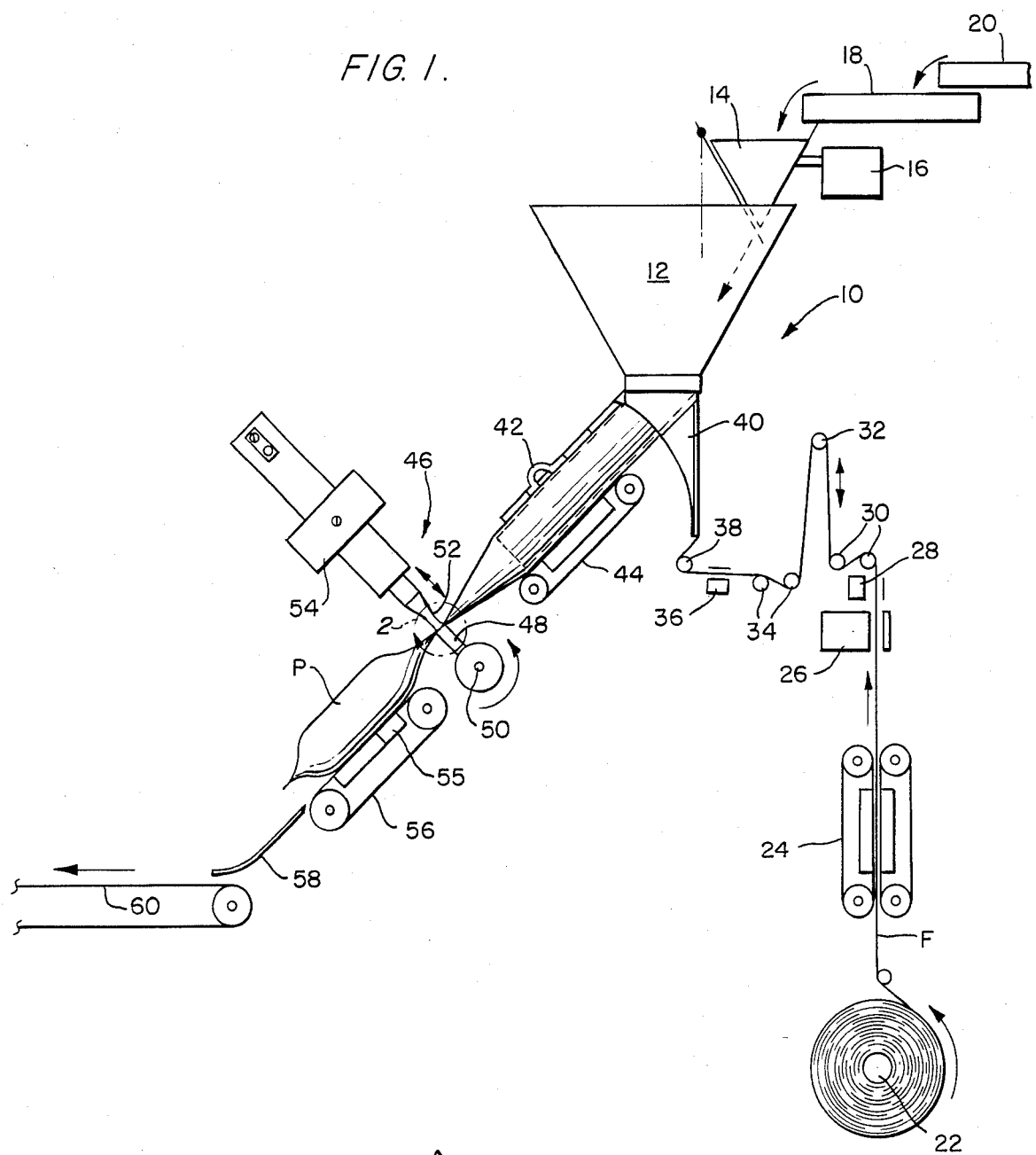
FIG. 1 is a schematic representation of the ultrasonic end seal apparatus of this invention applied to a typical slant/vertical form and fill machine.

With reference to FIG. 1 there is shown schematically a form and full machine 10 of a known commercially available type. Such machine has been modified in accordance with this invention. However, it has the conventional product funnel 12 into which the product is fed from a weigh pan 14 which in turn is controlled by a scale 16. Feed conveyors 18 and 20 feed the material to be packaged into the weigh pan 14 as is known in the art.

Packaging film F suitable for packaging the product is fed from a roll 22 by rotary vacuum box belt assemblies 24. The film is fed in a direction of the arrow in FIG. 1 past a code data printer 26 and an eye register device 28. Guide rolls 30 guide the web and a movable compensating roll 32 is provided for compensating registration of the web in reference to the seal position and package cutoff in the end seal by anvil 48 and horn 52. Adjustment rolls 34 are provided for edge adjustment as a result of an edge guide scanner 36. A guide roll 38 guides the web of film F to a film former or shoe 40 of the form and fill machine 10. These components just described are all known in the art, although not necessarily in the precise combination or location disclosed herein.

The web formed by the film former 40 is fed downwardly in the shape of a tube around the spout of the funnel 12. The longitudinal mating edges of the formed tube are continuously sealed by an ultrasonic back seal apparatus 42 which may conveniently be of the same design as that disclosed in my prior patent, U.S. Pat. No. 4,373,982, granted Feb. 15, 1983. A suitable vacuum box belt assembly 44 is also positioned on an edge of the funnel spout to further feed and control the downwardly forming tube. The film is thus formed into a tube and filled.

End seals are provided by an ultrasonic end seal assembly 46 which is the principal component of this invention. This end seal assembly provides an ultrasonic transverse end seal of the filled packages "one the fly", that is, while the form and fill machine is operating continuously. The ultrasonic assembly includes a back-up anvil or bar 48 having sealing lands 63 across the face thereof; the anvil being rotatable on a rotary drive shaft 50. The axis of the drive shaft is chosen such that it positions the anvil bar at a desired position for ultrasonic sealing and provides sufficient clearance in rotation to permit free fall of product internal of the tube for package filling. An ultrasonic horn 52 is provided with simulated rotary motion by a mounting assembly 54, shown in more detail in FIG. 3. The horn and anvil cooperate during their simultaneous rotary movement and provide an appropriate end seal for each package while on the move.

The filled packages are taken off by a vacuum box belt assembly 56 so as to handle them gently immediately after the ultrasonic seal, and are fed downwardly to a guide chute 58 and on to a take-off conveyor 60.

Figure 2:
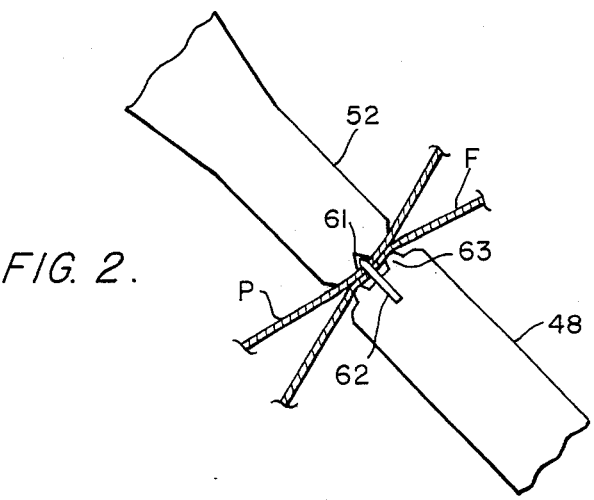
FIG. 2 is an enlarged schematic showing an ultrasonic horn, anvil, and cutting blade with the sealing material sandwiched therebetween at the point of sealing and severing.

FIG. 2 shows a detail of the horn and anvil at the time of ultrasonic sealing. The film F has been formed into a tube and the ultrasonic sealing accomplishes the sealing to form the package P. At the same time, the package is separated by a knife edge 62 extending outwardly from the anvil 48 a distance at least equal to the thickness of the compressed doubled film to cut through the end seal at the same time it is made. Preferably, a slot 61 is provided in horn 52 so that the knife edge 62 may protrude through the package film to insure package separation.

Because the ultrasonic horn and anvil are moving in a rotary motion, and contacting one another along arcuate paths, the faces of both the horn 52 and anvil 48 are curved slightly, the degree of curvature corresponding to the arcuate path followed by the respective units.

Figure 3:
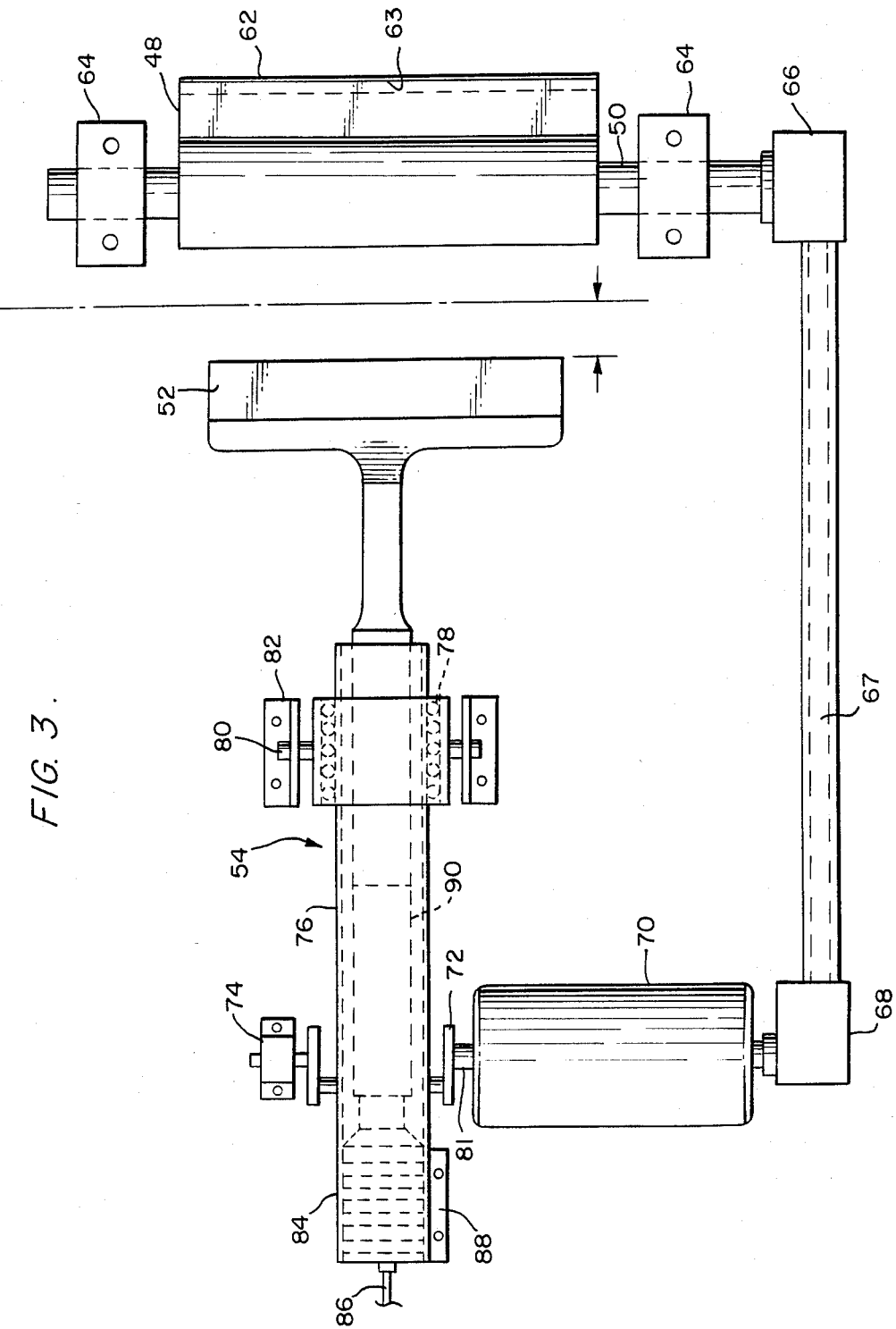
FIG. 3 is a top plan view of a preferred form of the sealing horn and anvil and the drive therefor.

Refer now to FIG. 3 for a detailed description of the ultrasonic horn mounting assembly drive and the anvil mounting assembly and drive. The anvil shaft 50 is journalled in stationary bearings 64 which are positioned to present the knife edge 62 and sealing lands 63 to the package film during the sealing as shown in FIG. 2. A pair of angled bear boxes 66 and 68 connected by a shaft 67 provide the drive connection to shaft 50 from a DC drive motor 70. The motor 70 also drives, by means of shaft 81, a crank eccentric 72 which is journalled in a stationary bearing 74. The crank eccentric is connected to a hollow member 76, and this member is in turn longitudinally supported by a linear bearing assembly 78. The linear bearing assembly is pivotally mounted on a pivot shaft 80 which is journalled in pivot blocks 82. These pivot blocks are stationary during movement, but can be adjusted linearly along the length of the member 76.

An ultrasonic converter 84 of a known type is connected to a source of power through a line feed through line inlet 86 and clamped in place with a clamp 88. An ultrasonic booster 90 is provided within the hollow member tube 76 to provide amplification of the ultrasonic energy to the horn 52.

FIGS. 4 and 5 illustrate the movement of the crank eccentric 72 on the left hand side and the face of the horn 52 on the right hand side. The difference between FIGS. 4 and 5 is the different adjusted position of the pivot shaft 80. This difference in position of the pivot shaft 80 causes a difference in the simulated linear movement of the horn 52 as can be seen by comparing these figures.

In operation of the invention, the film F is fed from roll 22 by vacuum belts 24 and after suitable date printing and registery is guided to the vertical form and fill machine 10. The product is loaded into a form tube via hopper 12. The tube is formed by shoe 40 and a back seal is provided along the length of the tube by ultrasonic sealing apparatus 42.

Registration via register 28 is used to advance or retard the printed package film in order to assure precise package registration at the seal and cut-off point. This compensates for vacuum belt speeds and film nip.

At the ultrasonic back sealing area the drive motor 70 powers the back-up anvil 48 and the ultrasonic sealing horn 52 and the other ultrasonic sealing hardware in synchronism. The ultrasonic end seal horn is specifically constructed and mounted to permit the desired simulated rotation of the horn into and away from the anvil via rotation of the crank arm 72. The rotation of the horn 52 and the amount of its travel is governed by the length of the eccentric crank arm and the fixed position of the pivot holder 82 for pivot shaft 80 as shown in FIGS. 4 and 5. By change of position of the pivot point of the shaft 80 the residence time of the ultrasonic horn may be increased or decreased in the area of the seal.

A vibratory device 55 as shown schematically in FIG. 1 for settling or stripping excess product height in the bag may be mounted ahead of or on the vacuum belt box following the seal position of the ultrasonic seal horn and anvil area. The vibrator is activated and run continuously during the product fill cycle to move product in the area to be sealed down into the bag before package seal takes place.

The package end sealing takes place when both the rotary anvil 48 and the ultrasonic sealing horn 52 are at their closed position directly opposite each other and the package film F is between the two in a state of relative compression. Power to the ultrasonic unit may be cycled on and off by the eye registration equipment 28. Seal size of course varies with specific package requirements and the inherent properties of the packaging material.

Package severance is achieved at the time of the seal by action of the blade 62 extending from the ultrasonic anvil and between lands 63 to a depth approximately equal to or slightly greater than two compressed thicknesses of the material being sealed as shown in FIG. 2. The blade 62 may protrude through the film into slot 61 in horn 52 causing separation across the seal width. The vacuum belt system 56 maintains a position of the severed bag to eliminate stress on the newly sealed package while the sealants return to a solid state by cooling off. Packaging severance may also be achieved ultrasonically by transmission of sufficient ultrasonic energy through a land area having a substantially more pointed contact surface than the squared or rounded land areas 63 of anvil 48, and causing greater compression of the packaging film than results when sealing with land areas 63.

Figure 6:
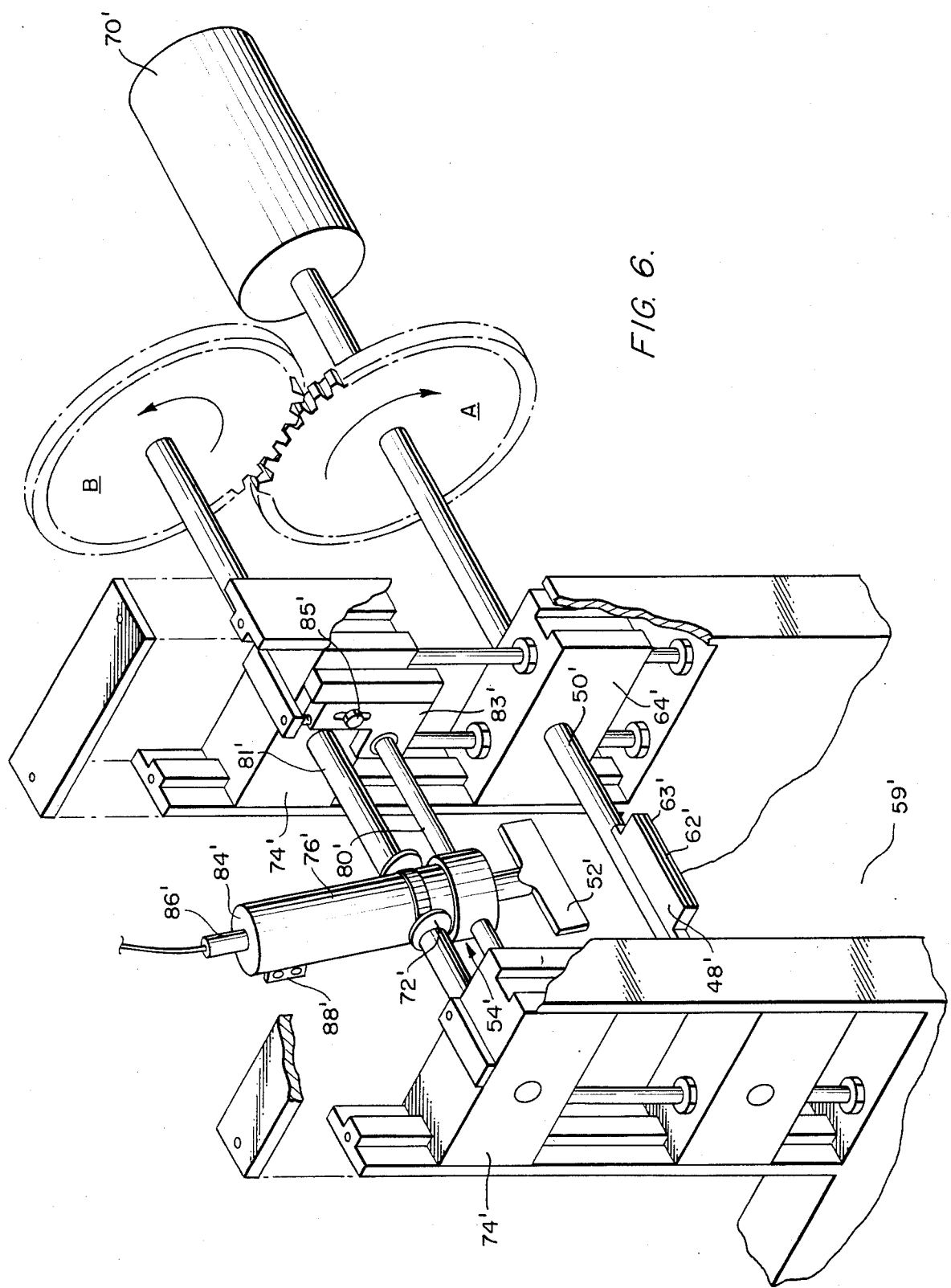
FIG. 6 is a side elevational view, partly broken away, illustrating an alternate modification of the ultrasonic sealing means for sealing the end seal portions of the strip packaging film on a horizontal packaging apparatus.

In addition to converting a typical vertical or slant front form and fill machine to complete ultrasonic sealing in accordance with this invention, it is also possible to convert a standard horizontal package maker with thermal seal systems for the back and end seals to a rotary continuous ultrasonic sealing system utilizing an ultrasonic seal unit in place of a thermal seal system, including an ultrasonic horn mounting assembly and drive system with the anvil mounting assembly and drive in cooperation with a back seal unit 42 (see FIG. 1). As shown in FIG. 6, wherein like numerals have been applied to like elements previously described, the horn and anvil 52' and 48' respectively, are positioned relative to a horizontal, moving work surface or conveyor indicated generally at 59'. The back-up anvil or bar 48' is rotatably positioned on a rotary drive shaft 50'. As in the vertical form and fill packager described above, the axis of the drive shaft is chosen so that it positions the anvil bar at a desired position for ultrasonic sealing. The ultrasonic horn 52' is provided with simulated rotary motion by a mounting assembly 54'.

The anvil shaft 50' is journalled in stationary bearings 64' which are positioned to present the knife edge 62' and sealing lands 63' to the package film during the sealing operation. A pair of intermeshing gears shown schematically as A and B provide the drive connection between lower shaft 50' and upper shaft 81'. Gear A is attached to shaft 50' which in turn is connected to drive motor 70' for actuation of the gears and shafts 50' and 81' respectively. Upper shaft 81' drives a crank eccentric 72' which is journalled in a stationary bearing 74'. The crank eccentric is connected to a hollow member 76' which in turn is pivotally mounted on a pivot shaft 80' which is journalled in pivot blocks 83'. These pivot blocks are stationary during the sealing operation but have adjusting bolt 85' for vertical adjustment along the length of member 76'.

An ultrasonic converter 84' of a known type is connected to a source of power through a line fed through line inlet 86' and clamped in place with a clamp 88'. An ultrasonic booster (see FIG. 3) is provided within the hollow member tube 76' to provide amplification of the ultrasonic energy to the horn 52'.

In operation, the drive motor 70' actuates drive shaft 50', gears A and B and shaft 81' in synchronism. The ultrasonic end seal horn 52' is constructed and mounted to permit the desired simulated rotation of the horn into and away from anvil 48' via rotation of crank eccentric 72'. The rotation of the horn 52' and the amount of its travel is governed by the fixed position of the pivot block or holder 83' for pivot shaft 80' as shown in FIG. 6. Since the provisions for seal registration and film advance/retard are inherent in a horizontal machine, only the signal from registration will be required to supply power to the ultrasonic unit to produce the end seal. A back seal assembly as shown in FIGS. 2 and 3 would be provided.

It can be seen that disclosed herein is a method and apparatus for producing ultrasonic sealing in connection with form and fill package machines which eliminate the conventional thermally heated end and back seals, increases production, saves energy and power, and provides high quality sealing.

What is claimed is:

1. Apparatus for making an ultrasonic end seal on a package produced in connection with the form and fill machine, the apparatus comprising: a movable ultrasonic horn, mounting means with an adjustable arcuate movement for moving an adjustable said horn into juxtaposition with one side of the package, a movable ultrasonic anvil mounted for rotary movement, means for moving the anvil into juxtaposition with the other side of the package, means for synchronizing the movement of the ultrasonic horn and anvil so that they are simultaneously positioned on opposite sides of the package to accomplish ultrasonic sealing while the package is moving, means for supplying power to the ultrasonic horn when the horn and the anvil are on opposite sides of the package with the package therebetween, and said mounting means for the ultrasonic horn comprises a crank eccentric mounting means for driving the horn through a movable and adjustable pivot point so that by change of position of the pivot point the residence time in the area of the seal may be increased or decreased.

2. Apparatus as defined in claim 1 further comprising package cutting means incorporated into the anvil.

3. Apparatus as defined in claim 2, wherein said anvil is further provided with sealing lands on opposite sides of said cutting means.

4. Apparatus as in claim 3 wherein the package cutting means is a knife edge extending the length of the anvil and positionable transverse to the movement of the package and movable into and out of contact with the package.

5. Apparatus as defined in claim 2 further comprising a vacuum belt take-off system for taking off severed filled packages gently to reduce stress on the newly ultrasonically sealed package.

6. Apparatus as in claim 1 further comprising means in conjunction with the ultrasonic horn and anvil for contacting the packages and settling or stripping excess product to remove excess product from the area to be sealed prior to ultrasonic sealing.

7. Apparatus as in claim 6 wherein the means for contacting the bags and settling excess product is a vibrator.

8. Apparatus as in claim 7 further comprising vacuum belt means for feeding the package through the apparatus.

9. Apparatus as in claim 8 further comprising means for detecting registration marks on the package film and controlling the ultrasonic sealing thereby.

10. Apparatus as defined in claim 9 further comprising package cutting means incorporated into the anvil.

11. Apparatus as defined in claim 10, wherein said anvil is further provided with sealing lands on opposite sides of said cutting means.

12. Apparatus as in claim 11 wherein the package cutting means is a knife edge extending the length of the anvil and positionable transverse to the movement of the package and movable into and out of contact with the package.

13. Apparatus as defined in claim 10 further comprising a vacuum belt take-off system for taking off severed filled packages gently to reduce stress on the package.

14. Apparatus for making an ultrasonic end seal on a package produced in connection with a horizontal form-and-fill machine, the apparatus comprising: mounting means for an ultrasonic horn, a movable ultrasonic horn, means for moving said horn into juxtaposition with one side of the package, a rotatably mounted ultrasonic anvil, means moving the rotatable anvil into juxtaposition with the other side of the package, means for synchronizing the movement of the ultrasonic horn and anvil so that they are simultaneously positioned on opposite sides of the package to accomplish ultrasonic sealing while the package is moving, means for supplying power to the ultrasonic horn when the horn and anvil are simultaneously positioned on opposite sides of the package to effect ultrasonic sealing with the package therebetween, wherein the mounting means for the ultrasonic horn provide adjustable arcuate movement and comprise a crank eccentric mounting means for driving the horn through a movable and adjustable pivot point so that by change of position of the pivot point the residence time in the area of the seal may be increased or decreased.

15. Apparatus as in claim 14 further comprising means for detecting registration marks on the package and controlling the ultrasonic sealing thereby.

* * * * *